July 22, 1958 D. E. SHEPHERD 2,844,419
REAR AXLE SEAL

Filed June 11, 1956 2 Sheets-Sheet 1

DALLAS E. SHEPHERD
INVENTOR.
Huebner, Beehler, Worrel & Herzig
BY
Vernon D. Beehler
ATTORNEYS.

July 22, 1958 D. E. SHEPHERD 2,844,419
REAR AXLE SEAL
Filed June 11, 1956 2 Sheets-Sheet 2
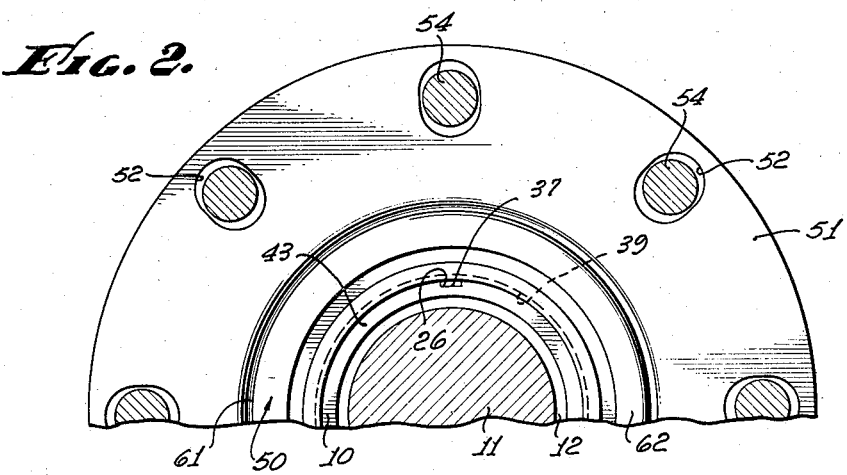
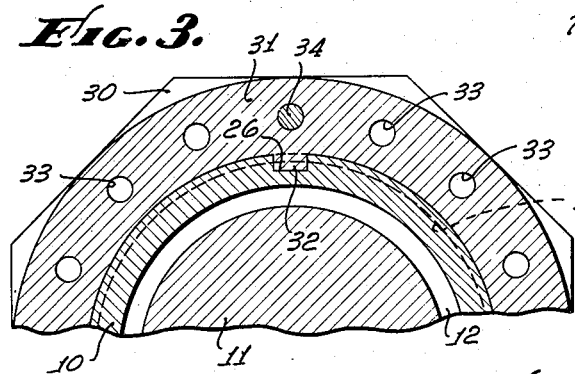
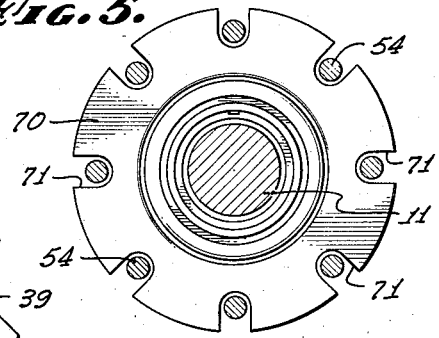
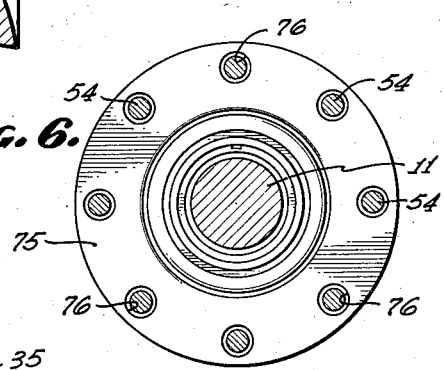
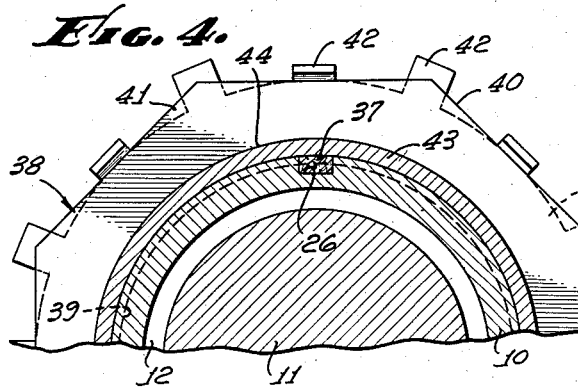
DALLAS E. SHEPHERD
INVENTOR.
Huebner, Beehler, Worrel & Herzig
BY
Vernon D. Beehler
ATTORNEYS.

United States Patent Office 2,844,419
Patented July 22, 1958

2,844,419

REAR AXLE SEAL

Dallas E. Shepherd, Compton, Calif.

Application June 11, 1956, Serial No. 590,697

4 Claims. (Cl. 308—187.1)

The invention relates to seals for vehicle wheels and has particular reference to a wheel bearing seal assembly for the axle of a motor vehicle wherein lubricants of different physical consistencies need to be kept apart so that one will not be affected by the other.

Certain structures for use on rear axles have by reason of their performance become widely standardized, these being structures involving an axle housing anchored to the vehicle, an axle extending into the axle housing, and a cap or end plate constituting part of the axle to which the wheel hub is fastened, the hub being mounted on roller bearings so as to be rotatably supported upon the axle housing. A suitable lubricant for the roller bearing consists of a heavy grease with which the bearing is packed when the assembly is put together. It is also important that when roller bearings are used, races of the roller bearings are tapered and the races need to be adjusted one with respect to the other so that the bearings ride smoothly. Those adjustments need to be made at the time the assembly is mounted in place and once the adjustment is made it must be one such as will not get out of adjustment during use.

Because of the fact that the adjusting mechanism consisting as it does of nuts, washers and locking means, all of necessity movable on the exterior of the axle housing, those surfaces along which movement takes place leaves a potential path whereby a light lubricant such as may be used within the axle housing can find its way over the exterior of the housing into that portion of the assembly which needs to contain only heavy grease. The very fact that a keyway must be provided adds to the hazard of forming a path through which light oils may inadvertently pass into the wrong chamber. The fact that the keyway may contain metal keying means is not sufficient to effectively block infiltration of the lighter lubricant.

A further impediment to the effective prevention of mixing of the lubricants is a lack of flexibility in the mounting of a wiper ring or rotating seal in conventional assemblies which causes the circumferential contact between the wiper ring and the rotating exterior portions of the housing to be uneven and thereby add to the possible areas through which the lighter lubricant may find its way into the heavy lubricant compartment.

The result of improper sealing in wheel bearing seal assemblies heretofore in use is a deterioration of the lubrication for the roller bearings as grease is thinned when oil heated during operation of the vehicle finds its way into the compartment containing the heavier grease, which deterioration may extend into the breaking area with consequent operational hazard.

It is therefore an object of the invention to provide a new and improved wheel bearing seal assembly which effectively separates the compartment containing heavy grease for the roller bearings from the space containing the lighter lubricants in such fashion that even during long periods of continued use under circumstances where the lighter lubricant might by reason of heating creep more readily into contact with the heavy grease.

Another object of the invention is to provide in a wheel bearing seal assembly an effective seal by means of which any likelihood of a leak of light lubricant past the keyway is effectively prevented.

Still another object of the invention is to provide in a wheel bearing seal assembly a new and improved mounting for a wiper ring or rotating seal such that the wiping or rotating sealing surfaces are in uniform contact, which contact can be achieved virtually automatically and which will remain so when the hub is bolted to the axle assembly.

Still another object of the invention is to provide in a wheel bearing seal assembly apertures in the wiper seal plate of such size and orientation with respect to bolts passing therethrough that the wiper seal plate may be moved into proper adjustment irrespective of whether or not the bolts might be located to some degree slightly out of the anticipated positions.

Still further among the objects of the invention is to provide in a wheel bearing seal assembly a new and improved means for adjusting and anchoring the roller bearings in proper adjustment, which adjusting means once in place and there secured serves also to improve the sealing of that area against intercommunication by lighter lubricants with a heavy lubricant around the roller bearings.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 2 is a cross-sectional view taken on the line 2—2 of Figure 1.

Figure 3 is a cross-sectional view taken on the line 3—3 of Figure 1.

Figure 4 is a cross-sectional view taken on the line 4—4 of Figure 1.

Figure 5 is a cross-sectional view of a modified form of the device showing the full cross section at the area in general corresponding to Figure 2.

Figure 6 is a cross-sectional view of still another modified form of the device similar to Figure 5.

Figure 1:
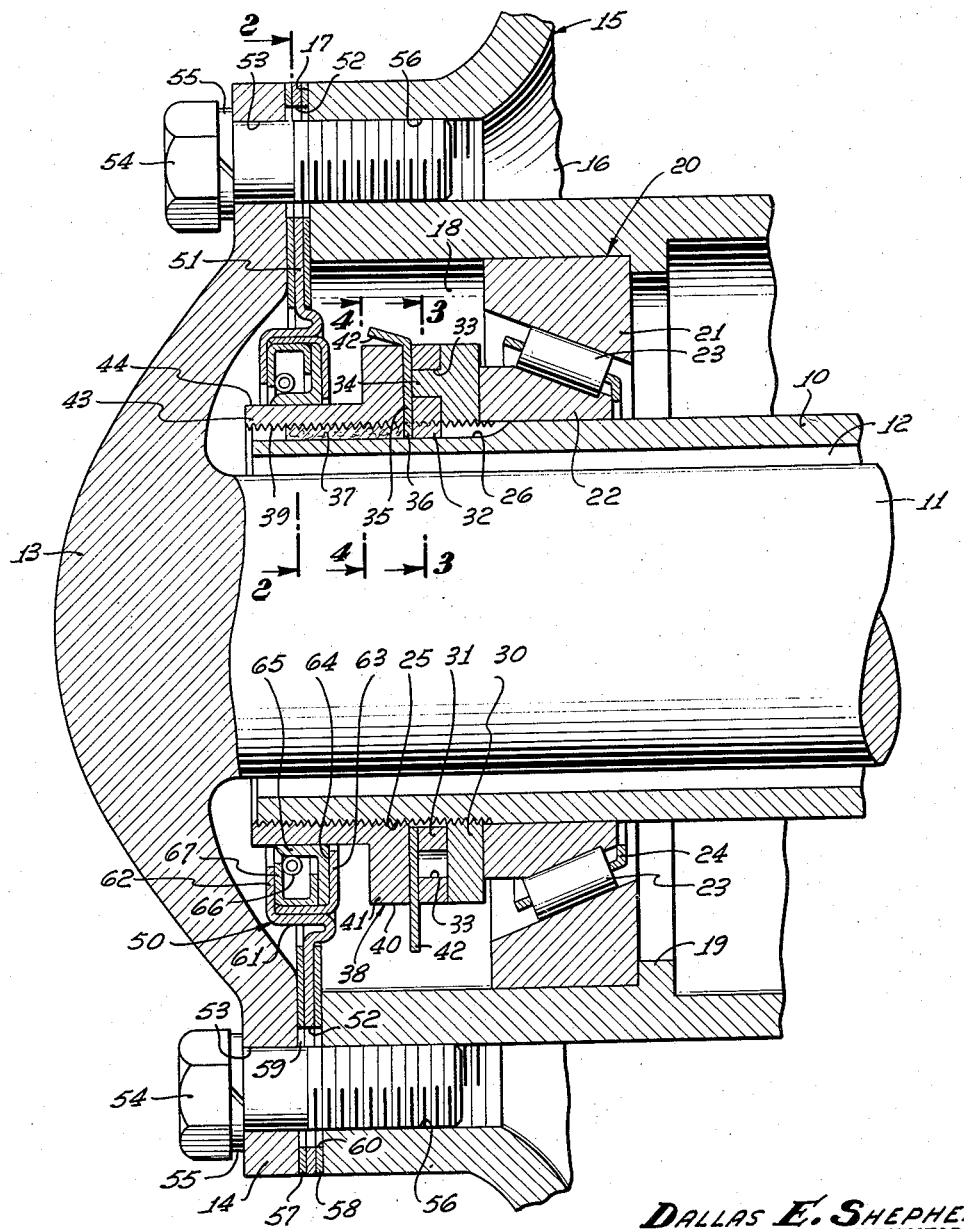
Figure 1 is a longitudinal sectional view of a wheel bearing seal assembly.

In the form of the invention chosen for the purpose of illustration an axle housing 10 of a conventional type customarily employed as the rear axle housing of a truck or automotive vehicle is adapted to have mounted therein an axle 11 spaced from the housing and providing therebetween a space 12. A cap 13 is connected to and comprises a part of the axle 11. In the chosen embodiment the cap is somewhat dome-shaped and terminates in a peripheral flange 14. A wheel 15 is shown for convenience as a fragmentary portion inasmuch as the wheel is of conventional construction. The wheel includes a hub 16 having an outer face 17 over which the flange 14 is applied. Within the hub is a hub cavity or pocket 18 which in effect is closed by the cap 13. At the inner end of the pocket is an annular raised portion 19 which serves as a keeper for a conventional roller bearing assembly 20 consisting as shown of an outer race 21, an inner race 22, and a series of roller bearings 23 contained in a suitable retainer 24.

On the outside surface of the housing 10 adjacent the outer end are threads 25, the threads extending inwardly to a location spaced slightly inwardly relative to the outer end of the bearing assembly. A keyway 26 extends axially throughout the entire length of the threads.

To hold the bearing assembly in a suitable position of adjustment there is provided a bearing race adjustment nut 30 having a threaded interior by means of which it can be advanced along the threads 25 to a position against the outer end of the bearing race 22. The adjustment nut can be threaded inwardly to a position where the bearing race 22 is in proper adjustment with respect to the bearings 23 and the bearing race 21. Once the proper adjustment has been achieved, the adjustment nut is anchored in position by moving an adjustment nut washer 31 axially to a position against the adjustment nut 30. A key 32 on the adjustment nut washer is received and retained in the keyway 26. In order to lock the washer to the nut the washer is provided with a plurality of circumferentially spaced projection receiving holes 33, any one of which is adapted to receive a projection 34 extending outwardly from the adjustment nut 30. By this engagement the adjustment nut can be locked in position which is for all practical purposes virtually any position of adjustment by reason of the rather small angular distance between successive holes 33 which reflect movement axially by a distance of only a small fraction of an inch.

After the washer has been positioned in the manner described, a lock ring 35 is slid axially into position against the washer. The lock ring also includes a key 36 which is received in the keyway 26 to prevent rotation of the lock ring.

In the usual assembly steps a sealing plug 37 of some acceptable sealing material as, for example, cork composition, synthetic rubber, or plastic, is pressed into the keyway 26 and preferably pushed against the outside face of the key 36. After the plug has been pushed into position a flanged lock nut 38 is screwed into place. An inner threaded surface 39 on the lock nut cuts its way into the outer surface of the plug 37 while the lock nut is advanced into position. The lock nut has flat faces 40 on the perimeter of a flange 41 so that tabs 42 of the lock ring may be bent over against the flat faces, thereby to lock the lock nut non-rotatably with respect to the lock ring. A sleeve 43 of the lock ring has a smooth exterior surface 44 which extends outwardly to a location substantially flush with the outer end of the housing 10.

To separate the cavity or pocket 18 from the annular space 12 there is provided a shaft seal or wiper seal assembly indicated generally by the reference character 50. The shaft seal assembly consists of a supporting plate, the main portion of which is annular and flat and which in the embodiment of Figures 1 and 2 contains a plurality of circumferentially spaced elongated holes 52. These holes 52, in addition to being longer than adjacent bolt holes 53 in the flange 14, are also greater in width than the diameter of those same bolt holes. Bolts 54 provided with lock washers 55 extend through the bolt holes and the elongated holes 52 into tapped holes 56 of the hub 16. To seal the engagement of the flange 14 with the hub 16 gaskets 57 and 58 are applied respectively to the outside and inside faces of the plate 51. The gaskets are preferably provided with elongated holes 59 and 60, respectively, corresponding in location, shape and size with the holes 52.

Inwardly of the plate 51 is a formed sectional portion 61 terminating in an annular flange 62. A flanged ring 63 having an angular shape in cross section is applied to the annular flange 62 to form a recess 64 within which is located a spring loaded seal assembly. The seal assembly includes a wiper ring 65 retained in wiping or sliding relationship with the surface 44 by means of a spring 66 held in an annular spring keeper 67. The last defined portions of the shaft seal assembly follow substantially conventional patterns.

It is essential that the wiper ring has a uniform engagement with the surface 44 of the sleeve 43 throughout the circumference. This means that the plate 51 must be permitted to assume a centered position with respect to the axle housing 10. Therefore, once the proper position is assumed, the plate must not be disturbed when the cap 13 is bolted upon the hub 16. The enlarged hole 52 permits this to be accomplished since, if there is some slight misalignment of the geometric centers of the holes 52 with respect to the bolts 54 when thrust through the appropriate bolt holes, likewise slightly misaligned relatively, the centering of the plate will not be disturbed since the bolts are smaller in diameter than the enlarged holes 52. Accordingly there can be a slight shift of the plate either radially or circumferentially or in a direction which combines radial and circumferential shift. A tight wiper seal is therefore assured.

Accordingly when the pocket 18 is packed with heavy grease, lighter lubricating oil in the space 12 which, when becoming warm or hot during operation, might tend to creep into the pocket 18, is prevented from creeping over the exterior of the sleeve 43 by the precise centering of the plate 51 and hence the shaft seal assembly. The oil is also prevented from passage through the keyway 26 by the plug 37 which is packed in place and anchored there by threaded engagement of the exterior of the plug with the threaded surface 39 at the interior of the sleeve 43.

The plate 51 may take one of a number of different forms as illustrated, for example, in Figure 5 where a plate 70 is provided with a plurality of circumferentially spaced inwardly extending open end apertures 71. The apertures in each instance are wider than the diameter of the bolts 54 and extending inwardly to a depth beyond the innermost edge of the same bolts 54. Hence the plate 70 can also take any one of a number of different positions of adjustment without prospect of having that adjustment disturbed when the bolts are placed in position.

In another form of the device which lends itself to inexpensive fabrication methods, there is disclosed a plate 75 corresponding in general to the plate 51, the plate 75 being provided with a plurality of circumferentially spaced enlarged circular apertures 76 having each a diameter substantially greater than the exterior diameter of the bolts 54 which are adapted to pass through the apertures 56. Hence the plate 75 is adjustable with equal facility and remains undisturbed in adjustment when the bolts are applied to hold the hub on the axle. Gaskets in each instance are comparable to the gaskets 57 and 58 with respect to the size and location of appropriate openings to admit passage from the bolts.

There has accordingly been described herein a wheel bearing seal assembly which includes important structural features assuring against the thinning out of grease around the bearings by dilution with oil from around the axle by reason of the fact that those areas where sealing must take place are securely packed and have the sealing material uniformly distributed.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. An anchored seal for a vehicle wheel comprising an axle housing, a hub surrounding said housing providing a bearing pocket therebetween and a bearing ring assembly mounting the hub on the housing, an axle extending through and spaced from the housing and a cap forming part of the axle closing an outer end of said pocket and having a flange overlying said hub, matching bolt holes in said hub and said flange and bolts secured in said holes for attaching said hub to said flange, the end of said axle housing having a longitudinal key-way and sealed means for adjusting said bearing ring assembly comprising a bearing race adjustment nut threadable on said housing to a position against said bearing ring assembly, said nut having an axial projection thereon, and an adjusting nut washer slidable over said housing having a plurality of circumferentially spaced projection receiving holes and a key thereon receivable in said key-way, a lock ring slidable over said housing to a position against said adjusting nut washer, a key on said ring receivable in said key-way, a seal plug filling said key-way to a depth abutting the key on said ring, and a flanged lock nut threadably engaging said housing and said seal plug to a position against said ring.

2. An anchored seal for a vehicle wheel comprising an axle housing, a hub surrounding said housing providing a bearing pocket therebetween and a bearing ring assembly mounting the hub on the housing, an axle extending through and spaced from the housing and a cap forming part of the axle closing an outer end of said pocket and having a flange overlying said hub, matching bolt holes in said hub and said flange and bolts secured in said holes for attaching said hub to said flange, a shaft seal assembly comprising a supporting plate between the hub and the flange having bolt-receiving apertures each exceeding the diameter of said bolts, gaskets on opposite sides of said plate having enlarged holes matching the bolt receiving apertures, and a wiper seal assembly on the plate, said housing having a threaded exterior and a longitudinal key-way throughout the length of said threads, and sealed means for adjusting said bearing ring assembly comprising a series of nuts and washers including a flanged lock out threadably engaging said housing and said series of nuts and washers, said flanged lock nut having a smooth-surfaced flange in rotatable sealing engagement with said wiper seal assembly.

3. A wheel bearing seal assembly for a vehicle wheel comprising an axle housing, a hub surrounding said housing providing a bearing pocket therebetween and a bearing ring assembly mounting the hub on the housing, an axle extending through and spaced from the housing and a cap forming part of the axle closing an outer end of a said pocket and having a flange overlying said hub, said pocket and having a flange overlying said hub, matching bolt holes in said hub and said flange and bolts secured in said holes for attaching said hub to said flange, a shaft seal assembly comprising a supporting plate between the hub and the flange having bolt-receiving apertures each radially and circumferentially exceeding the diameter of said bolts, gaskets on opposite sides of said plate having oversized apertures therein matching said bolt receiving apertures, and a wiper seal assembly on the plate, said housing having threads on the exterior and a longitudinal key-way throughout the length of said threads, and sealed means for adjusting said bearing ring assembly comprising a bearing race adjustment nut threadable on said housing to a position against said bearing ring assembly, said nut having an axial projection thereon, and an adjusting nut washer slidable over said housing having a plurality of circumferentially spaced projection-receiving holes and a key thereon receivable in said key-way, a lock ring slidable over said housing to a position against said adjusting nut washer, a key on said ring receivable in said key-way and a plurality of radially extending tabs thereon, a seal plug filling said key-way to a depth abutting the key on said ring, a flanged lock nut having threads therein engaging said housing and having an outer surface at a level above the bottom of the threads on the exterior of said housing and the outer surface of said seal plug to a position against said ring and having flat surfaces at the perimeter adapted to receive tabs in bent over locked position therewith, said nut having a smooth-surfaced flange in rotatable sealing engagement with said wiper seal assembly.

4. A lock nut assembly comprising a cylindrical housing having exterior threads at a free end thereof, a key-way having a depth exceeding the depth of the threads and having a length greater than the axial span of said threads, an adjusting nut threadedly received on said housing, an adjusting washer in engagement with said nut, projection means on said nut and means forming a plurality of circumferentially spaced holes in said washer in positions wherein one hole at a time is receptive of said projection, a key on said washer received in said keyway, a lock ring in face to face position against said washer and a key on said lock ring received in said keyway, a sealing plug of deformable material filling said keyway and in abutment against said last identified key, said plug having an outer surface extending outwardly of the base of the threads on said housing, and a lock nut having threads in engagement with the threads of the housing and simultaneously embedded in sealing relationship with the outer surface of said plug.

References Cited in the file of this patent
UNITED STATES PATENTS

| | | |
|---|---|---|
| 2,076,218 | Alden | Apr. 6, 1937 |
| 2,251,760 | Schantz et al. | Aug. 5, 1941 |
| 2,462,067 | Buckendale | Feb. 22, 1949 |
| 2,704,693 | Schwan | Mar. 22, 1955 |